United States Patent
Park

(10) Patent No.: US 10,901,888 B2
(45) Date of Patent: Jan. 26, 2021

(54) MEMORY SYSTEM AND OPERATING METHOD THEREOF

(71) Applicant: SK hynix Inc., Gyeonggi-do (KR)

(72) Inventor: Byeong-Gyu Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 40 days.

(21) Appl. No.: 16/225,196

(22) Filed: Dec. 19, 2018

(65) Prior Publication Data

US 2019/0361804 A1    Nov. 28, 2019

(30) Foreign Application Priority Data

May 23, 2018 (KR) .......................... 10-2018-0058112

(51) Int. Cl.
*G06F 12/02* (2006.01)

(52) U.S. Cl.
CPC .... *G06F 12/0246* (2013.01); *G06F 2212/401* (2013.01); *G06F 2212/7201* (2013.01)

(58) Field of Classification Search
CPC ......... G06F 12/0246; G06F 2212/7201; G06F 2212/401
See application file for complete search history.

(56) References Cited

U.S. PATENT DOCUMENTS

| | | | |
|---|---|---|---|
| 7,190,284 B1* | 3/2007 | Dye | G06F 12/023 711/170 |
| 2015/0143028 A1* | 5/2015 | Jung | G06F 12/0246 711/103 |
| 2015/0169226 A1* | 6/2015 | Shen | G06F 12/0238 711/103 |
| 2018/0018100 A1* | 1/2018 | Aho | G06F 3/0608 |
| 2019/0065387 A1* | 2/2019 | Duzly | G06F 12/0246 |

FOREIGN PATENT DOCUMENTS

KR    100706242    4/2007
KR    1020120135216    12/2012

* cited by examiner

*Primary Examiner* — Masud K Khan
(74) *Attorney, Agent, or Firm* — IP & T Group LLP

(57) ABSTRACT

A memory system includes a controller suitable for managing, first mapping information for mapping a number of first logical addresses among a logical addresses received from a host to a number of first physical addresses and second mapping information for mapping a number of second logical addresses among the logical addresses to a number of second physical addresses, the controller may compress the first mapping information of at least two first logical addresses, which are sequential, and at least two first physical addresses into first sequential mapping information, and may compress the second mapping information of at least two second logical addresses, which are sequential, and at least two second physical addresses into second sequential mapping information, the first physical addresses may be represented by a first number of bits, and the second physical addresses may be represented by a second number of bits.

8 Claims, 12 Drawing Sheets

| INDEX | LA | PA |
|---|---|---|
| 1 | LA<11> | PA<111> |
| 2 | LA<41> | PA<120> |
| 3 | LA<51> | PA<121> |

554

| INDEX | LA | PA |
|---|---|---|
| a | LA<421> | PA<7008> |
| b | LA<441> | PA<7011> |
| c | LA<451> | PA<7012> |

| INDEX | START LA | LA LENGTH |
|---|---|---|
| 1 | LA<21> | 5 |
| 2 | LA<31> | 3 |
| 3 | LA<61> | 4 |

| INDEX | START PA | PA LENGTH |
|---|---|---|
| 1 | PA<112> | 5 |
| 2 | PA<117> | 3 |
| 3 | PA<122> | 4 |

564

| INDEX | START PA | LA LENGTH |
|---|---|---|
| a | LA<401> | 4 |
| b | LA<411> | 3 |
| c | LA<431> | 2 |

| INDEX | START PA | PA LENGTH |
|---|---|---|
| a | PA<7001> | 4 |
| b | PA<7005> | 3 |
| c | PA<7009> | 2 |

# MEMORY SYSTEM AND OPERATING METHOD THEREOF

CROSS-REFERENCE TO RELATED APPLICATION

This application claims priority under 35 U.S.C. § 119(a) to Korean Patent Application No. 10-2018-0058112 filed on May 23, 2018, which is incorporated herein by reference in its entirety.

BACKGROUND

1. Field

Exemplary embodiments relate to a memory system, and more particularly, to a memory system including a nonvolatile memory device and an operating method thereof.

2. Discussion of the Related Art

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

SUMMARY

Various embodiments are directed to a memory system and an operating method thereof, capable of efficiently managing a mapping information for mapping a logical address and a physical address.

In an embodiment, a memory system may include: a nonvolatile memory device; and a controller suitable for managing, when a plurality of data and a plurality of logical addresses corresponding thereto are received from a host, first mapping information for mapping a number of first logical addresses among the logical addresses to a number of first physical addresses and second mapping information for mapping a number of second logical addresses among the logical addresses to a number of second physical addresses, the controller may compress the first mapping information of at least two first logical addresses, which are sequential, and at least two first physical addresses into first sequential mapping information, and may compress the second mapping information of at least two second logical addresses, which are sequential, and at least two second physical addresses into second sequential mapping information, the first physical addresses may be represented by a first number of bits, and the second physical addresses may be represented by a second number of bits.

The controller may further determine the logical addresses included in a first predetermined range as the first logical addresses, and the controller may further determine the logical addresses included in a second predetermined range as the second logical addresses.

The controller may further manage the first mapping information for mapping the first logical addresses, which are not sequential, and the first physical addresses one by one into first normal mapping information, the controller may further manage the second mapping information for mapping the second logical addresses, which are not sequential, and the second physical addresses one by one into second normal mapping information, and each piece of the first normal mapping information and the second normal mapping information may be represented by a third number of bits.

Each of the first sequential mapping information may include: a first start logical information including a start logical address of the at least two first logical addresses and a first index information for mapping with the first physical addresses; a first length logical information including an information on the number of the at least two first logical addresses; a first start physical information including a start physical address of the at least two first physical addresses and the first index information for mapping with the first logical addresses; and a first length physical information including an information on the number of the at least two first physical addresses.

Each of the second sequential mapping information may include: a second start logical information including a start logical address of the at least two second logical addresses and a second index information for mapping with the second physical addresses; a second length logical information including an information on the number of the at least two second logical addresses; a second start physical information including a start physical address of the at least two second physical addresses and the second index information for mapping with the second logical addresses; and a second length physical information including an information on the number of the at least two second physical addresses.

The controller may determine a bit size in the first number of bits necessary to count a largest value among the start physical addresses included in the first sequential mapping information, together with the first index information, and the controller may determine a bit size in the second number of bits necessary to count a largest value among start physical addresses included in the second sequential mapping information, together with the second index information.

The controller may calculate an average number of the numbers of first physical addresses included in the first sequential mapping information as a first average number, may reset a compression rate of the first sequential mapping information such that the number of first physical addresses included in the first sequential mapping information becomes equal to or smaller than the first average number, and may determine a bit size in the first number of bits necessary to count the first average number, and the controller may calculate an average number of the numbers of second physical addresses included in the second sequential mapping information as a second average number, may reset a compression rate of the second sequential mapping information such that the number of second physical addresses included in the second sequential mapping information becomes equal to or smaller than the second average number, and may determine a bit size in the second number of bits necessary to count the second average number.

The controller may set a maximum number and a minimum number in the numbers of first physical addresses included in the first sequential mapping information as a first maximum number and a first minimum number, respectively, may determine a bit size in the first number of bits"

necessary to count a difference between the first maximum number and the first minimum number, and may manage the first length physical information by using the determined bit size based on the first minimum number, the controller may set a maximum number and a minimum number in the numbers of second physical addresses included in the second sequential mapping information as a second maximum number and a second minimum number, respectively, may determine a bit size in the second number of bits necessary to count a difference between the second maximum number and the second minimum number, and may manage the second length physical information by using the determined bit size based on the second minimum number.

The controller may determine a bit size in the first number of bits necessary to count a maximum number among the numbers of first physical addresses included in the first sequential mapping information, and the controller may determine a bit size in the second number of bits necessary to count a maximum number among the numbers of second physical addresses included in the second sequential mapping information.

When a plurality of physical addresses values which sequentially increase from a predetermined start value correspond to a plurality of storage regions, respectively, included in the nonvolatile memory device, the controller may manage the first start physical information to have a bit size smaller than the second start physical information, in the case where start physical addresses included in the first sequential mapping information are relatively closer to the predetermined start value than start physical addresses included in the second sequential mapping information, and may manage the first start physical information to have a bit size larger than the second start physical information, in the case where start physical addresses included in the first sequential mapping information are relatively farther from the predetermined start value than start physical addresses included in the second sequential mapping information.

In an embodiment, a method for operating a memory system including a nonvolatile memory device, may include: an applying step of receiving, from a host, a plurality of data and a plurality of logical addresses corresponding thereto; a mapping step of managing first mapping information for mapping a number of first logical addresses among the logical addresses to a number of first physical addresses and second mapping information for mapping a number of second logical addresses among the logical addresses to a number of second physical addresses; a first managing step of compressing first mapping information for at least two first logical addresses, which are sequential, and at least two first physical addresses into first sequential mapping information; and a second managing step of compressing second mapping information for at least two second logical addresses, which are sequential, and at least two second physical addresses into second sequential mapping information, the first physical addresses may be represented by a first number of bits, and the second physical addresses may be represented by a second number of bits.

The method may further include: determining the logical addresses included in a first predetermined range as the first logical addresses; and determining the logical addresses included in a second predetermined range as the second logical addresses.

The method may further include: a third managing step of managing the first mapping information for mapping the first logical addresses, which are not sequential, and the first physical addresses one by one into first normal mapping information; and a fourth managing step of managing the second mapping information for mapping the second logical addresses, which are not sequential, and the second physical addresses one by one into second normal mapping information, each piece of the first normal mapping information and the second normal mapping information may be represented by a third number of bits.

Each of the first sequential mapping information may include: a first start logical information including a start logical address of the at least two first logical addresses and a first index information for mapping with the first physical addresses; a first length logical information including an information on the number of the at least two first logical addresses included; a first start physical information including a start physical address of the at least two first physical addresses and the first index information for mapping with the first logical addresses; and a first length physical information including an information on the number of the at least two first physical addresses.

Each of the second sequential mapping information may include: a second start logical information including a start logical address of the at least two second logical addresses and a second index information for mapping with the second physical addresses; a second length logical information including an information on the number of the at least two second logical addresses; a second start physical information including a start physical address of the at least two second physical addresses and the second index information for mapping with the second logical addresses; and a second length physical information including an information on the number of the at least two second physical addresses.

The first managing step may determine a bit size in the first number of bits necessary to count a largest value among the start physical addresses included in the first sequential mapping information, together with the first index information, and the second managing step may determine a bit size in the second number of bits necessary to count a largest value among start physical addresses included in the second sequential mapping information, together with the second index information.

The first managing step may include: calculating an average number of the numbers of first physical addresses included in the first sequential mapping information as a first average number; resetting a compression rate of the first sequential mapping information such that the number of first physical addresses included in the first sequential mapping information becomes equal to or smaller than the first average number; and determining a bit size in the first number of bits necessary to count the first average number, and the second managing step may include: calculating an average number of the numbers of second physical addresses included in the second sequential mapping information as a second average number; resetting a compression rate of the second sequential mapping information such that the number of second physical addresses included in the second sequential mapping information becomes equal to or smaller than the second average number; and determining a bit size in the second number of bits necessary to count the second average number.

The first managing step may include: setting a maximum number and a minimum number in the numbers of first physical addresses included in the first sequential mapping information as a first maximum number and a first minimum number, respectively; determining a bit size in the first number of bits necessary to count a difference between the first maximum number and the first minimum number; and managing the first length physical information by using the determined bit size based on the first minimum number, the second managing step may include: setting a maximum number and a minimum number in the numbers of second physical addresses included in the second sequential mapping information as a second maximum number and a second minimum number, respectively; determining a bit size in the second number of bits necessary to count a difference between the second maximum number and the second minimum number; and managing the second length physical information by using the determined bit size based on the second minimum number.

The first managing step may include determining a bit size in the first number of bits necessary to count a maximum number among the numbers of first physical addresses included in the first sequential mapping information, and the second managing step may include determining a bit size in the second number of bits necessary to count a maximum number among the numbers of second physical addresses included in the second sequential mapping information.

The method may further include, in the case where a plurality of physical addresses values, which sequentially increase from a predetermined start value, correspond to a plurality of storage regions, respectively, included in the nonvolatile memory device: managing the first start physical information to have a bit size smaller than the second start physical information, in the case where start physical addresses included in the first sequential mapping information are relatively closer to the predetermined start value than start physical addresses included in the second sequential mapping information; and managing the first start physical information to have a bit size larger than the second start physical information, in the case where start physical addresses included in the first sequential mapping information are relatively farther from the predetermined start value than start physical addresses included in the second sequential mapping information.

In an embodiment, a memory system may include: a memory device including a memory cell array represented by physical addresses; and a controller suitable for: mapping sequential logical addresses of one between first and second groups into the physical addresses during a write operation to the memory cell array in response to a sequential write command provided with the sequential logical addresses; compressing the mapped physical addresses into one or more compressed physical addresses each representing a length of consecutive physical addresses starting from one among the mapped physical addresses; dynamically determining bit-sizes to represent the compressed physical addresses respectively corresponding to the first and second groups; and storing the mapping relationship between the sequential logical addresses and the compressed physical addresses according to the dynamically determined bit-sizes thereby using the mapping relationship for a subsequent operation.

BRIEF DESCRIPTION OF THE DRAWINGS

These and other features and advantages of the present invention will become apparent to those skilled in the art to which the present invention pertains from the following detailed description in reference to the accompanying drawings, wherein:

FIGS. 7A and 7B and FIGS. 8A and 8B are diagrams which describe a characterizing mapping operation in accordance with an embodiment, in the mapping operation illustrated in FIG. 6.

DETAILED DESCRIPTION

Figure 1:
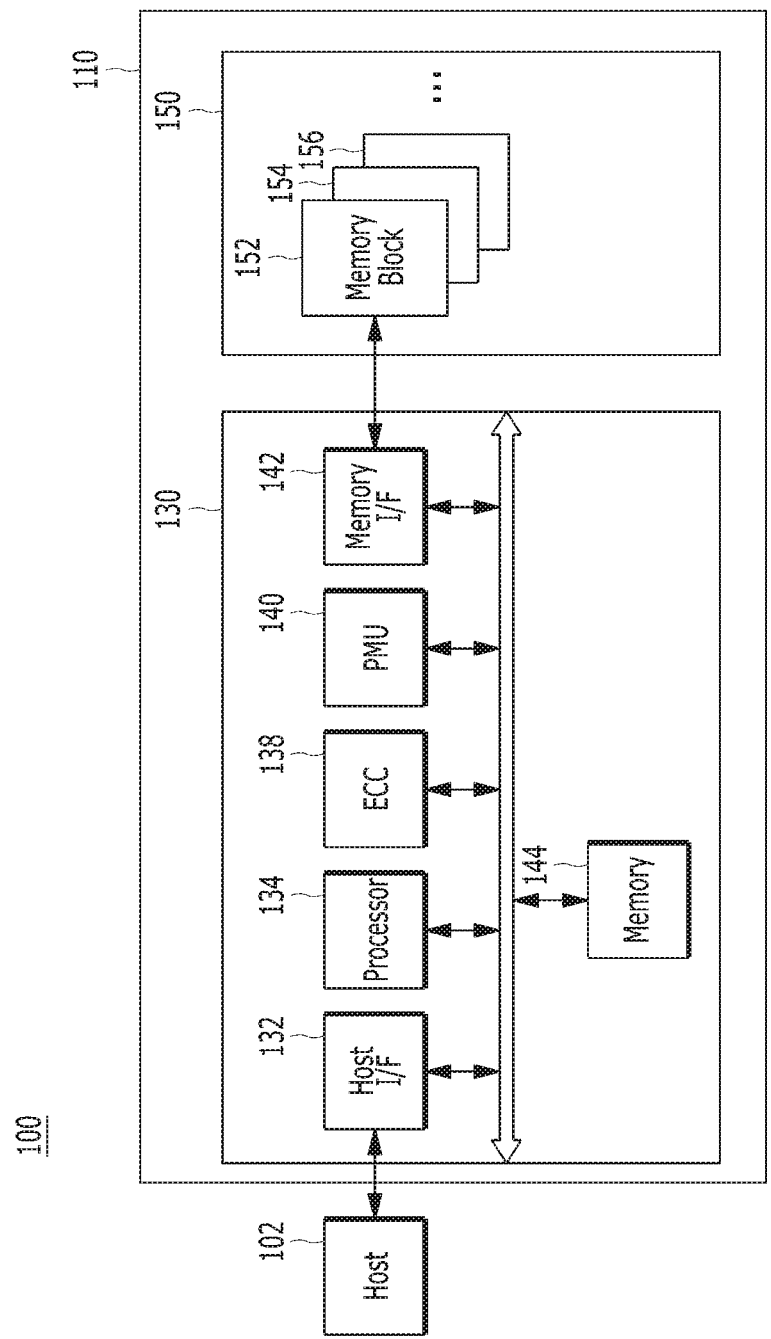
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art, and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensioanl (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program, and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program, and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as a flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
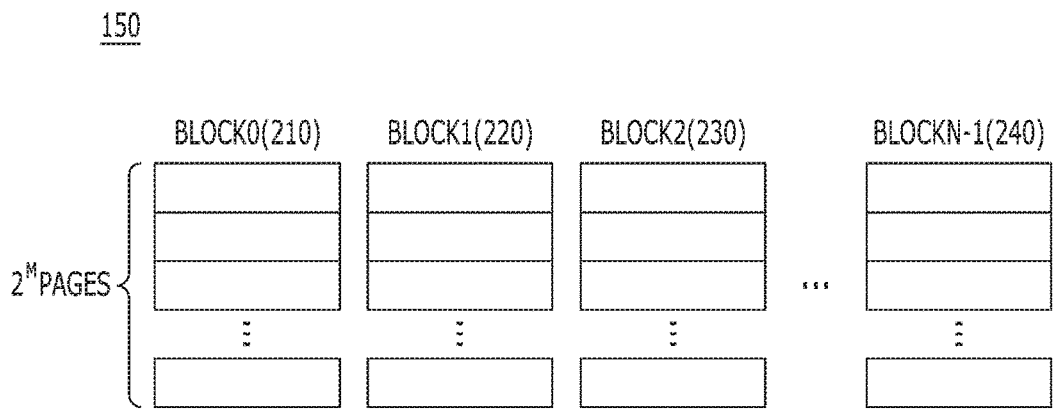
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks 0 to N-1, and each of the blocks 0 to N-1 may include a plurality of pages, for example, $2^M$ pages, the number of which may vary according to circuit design. Memory cells included in the respective memory blocks 0 to N-1 may be one or more of a single level cell (SLC) storing 1-bit data, or a multi-level cell (MLC) storing 2- or more bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
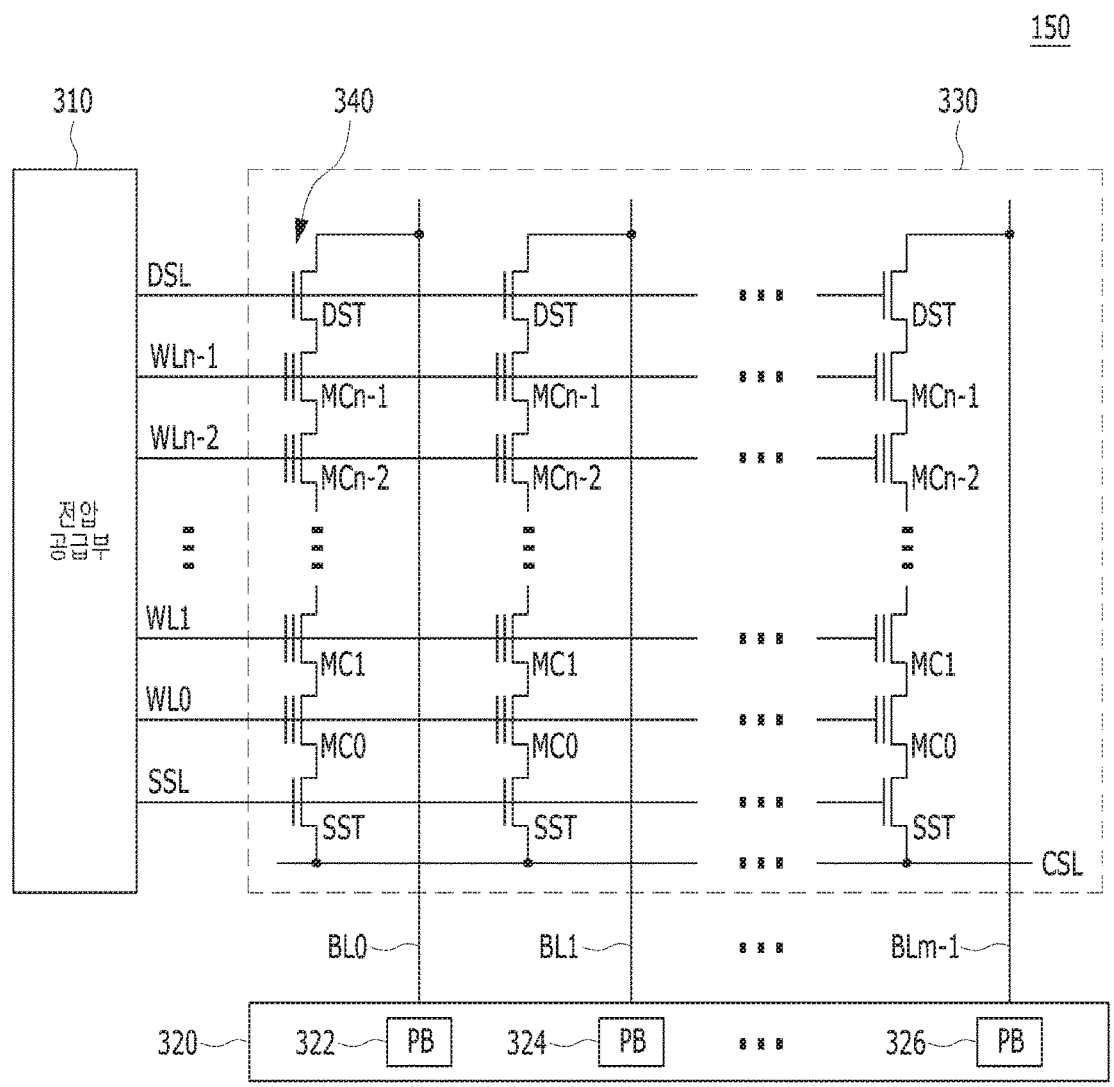
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
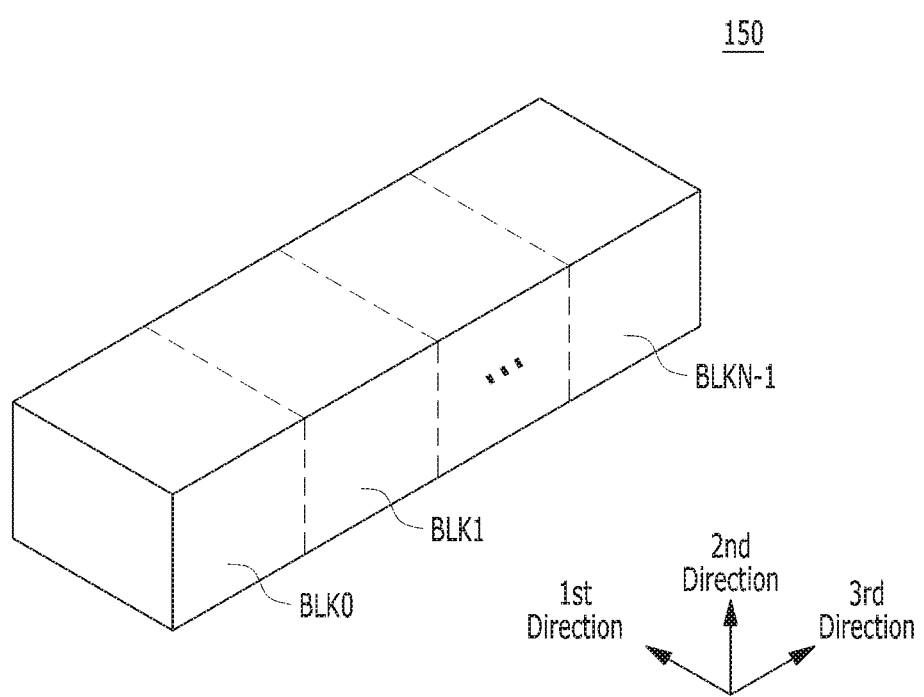
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN-1 each having a 3D structure (or vertical structure).

Figure 5:
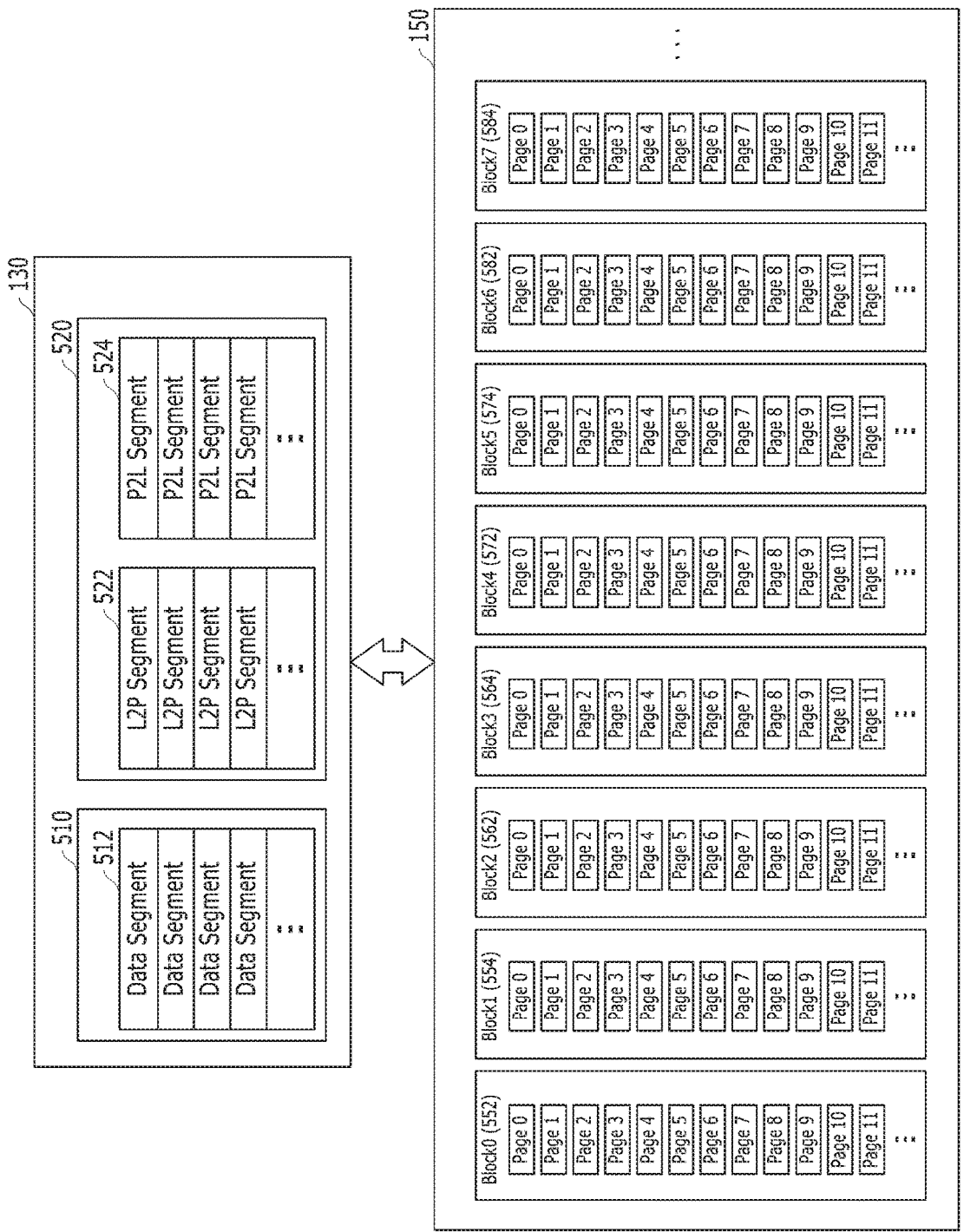
FIG. 5 is a schematic diagram which describes a data processing operation with respect to a memory device in a memory system in accordance with an embodiment.

FIG. 5 is a schematic diagram which describes a data processing operation with respect to a memory device in a memory system in accordance with an embodiment.

Referring to FIG. 5, the controller 130 may receive a program command, program data and logical addresses from the host 102. The controller 130 programs and stores the program data in the plurality of pages included in memory blocks 552, 554, 562, 564, 572, 574, 582 and 584 of the memory device 150, in response to the program command.

The controller 130 generates and updates metadata for the program data, and programs and stores the metadata in the memory blocks 552, 554, 562, 564, 572, 574, 582 and 584 of the memory device 150. The metadata include logical/physical (L2P: logical to physical) information and physical/logical (P2L: physical to logical) information for the program data stored in the memory blocks 552, 554, 562, 564, 572, 574, 582 and 584. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all remaining information and data except program data corresponding to a command received from the host 102.

The logical/physical (L2P: logical to physical) information and the physical/logical (P2L: physical to logical) information mean information in which physical addresses corresponding to the logical addresses are mapped by the controller 130 in response to the program command. The physical addresses may be addresses corresponding to physical storage spaces of the memory device 150 where the program data received from the host 102 are to be stored.

The controller 130 may store the mapping information between the logical addresses and the physical addresses, that is, the logical/physical (L2P: logical to physical) information and the physical/logical (P2L: physical to logical) information, in at least one memory block among the memory blocks 552, 554, 562, 564, 572, 574, 582 and 584 of the memory device 150. The at least one memory block which stores the logical/physical (L2P: logical to physical) information and the physical/logical (P2L: physical to logical) information may be referred to as a system block.

For example, the controller 130 caches and buffers the program data corresponding to the program command, in a first buffer 510 included in the memory 144 of the controller 130, that is, stores data segments 512 of user data in the first buffer 510 as a data buffer/cache. Thereafter, the controller 130 programs and stores the data segments 512 stored in the first buffer 510, in the pages included in the memory blocks 552, 554, 562, 564, 572, 574, 582 and 584 of the memory device 150.

As the data segments 512 of the program data are programmed and stored in the pages included in the memory blocks 552, 554, 562, 564, 572, 574, 582 and 584 of the memory device 150, the controller 130 generates L2P segments 522 and P2L segments 524 as metadata, and stores them in a second buffer 520 included in the memory 144 of the controller 130. In the second buffer 520 of the memory 144 of the controller 130, the L2P segments 522 and the P2L segments 524 may be stored in the form of a list. Then, the controller 130 may program and store the L2P segments 522 and the P2L segments 524 stored in the second buffer 520, in the pages included in the memory blocks 552, 554, 562, 564, 572, 574, 582 and 584 of the memory device 150, through a map flush operation.

Also, the controller 130 may receive a read command and logical addresses from the host 102. The controller 130 may read L2P segments 522 and P2L segments 524 corresponding to the logical addresses from the memory device 150 and load them in the second buffer 520, in response to the read command. Then, the controller 130 checks physical addresses of the memory device 150 corresponding to the logical addresses from the L2P segments 522 and the P2L segments 524 loaded in the second buffer 520, reads data segments 512 of user data from storage positions known through the checking, that is, specific pages of specific memory blocks among the memory blocks 552, 554, 562, 564, 572, 574, 582 and 584, stores the data segments 512 in the first buffer 510, and provides the data segments 512 to the host 102.

As described above, each time a read command and logical addresses are received from the host 102, the controller 130 may read L2P segments 522 and P2L segments 524 corresponding to the logical addresses, and load them in the second buffer 520. Frequent repetition of the operation of loading L2P segments 522 and P2L segments 524 in this way may cause the performance degradation of the read operation.

As the controller 130 may load a greater amount of L2P segments 522 and P2L segments 524 from the memory device 150 at a time, a single operation of loading L2P segments 522 and P2L segments 524 may deal with the greater number of read commands. Through this, read performance of the memory system 110 may be improved.

Meanwhile, L2P segments may be optimized to search for physical addresses corresponding to specific logical addresses, and, as a result, may be efficient in searching for physical addresses to be mapped to logical addresses inputted from the host 102, in a read operation.

Also, P2L segments 524 may be optimized for a program operation. The controller 130 may need to quickly allocate storage spaces in the memory device 150 for storing program data, when receiving a program command, program data and logical addresses from the host 102. In this regard, the controller 130 may load in advance a list of available physical addresses in the second buffer 520. Therefore, at a time when the program command, the program data and the logical addresses are received from the host 102, the controller 130 may quickly search the list of available physical addresses loaded in the second buffer 520, may map physical addresses for the program data, with the logical addresses, and may then store the program data in the storage spaces corresponding to the physical addresses. At this time, P2L segments 524 may be generated and be temporarily stored in the second buffer 520. The P2L segments 524 stored in the second buffer 520 may be stored in the memory device 150 through a map flush operation.

Figure 6:
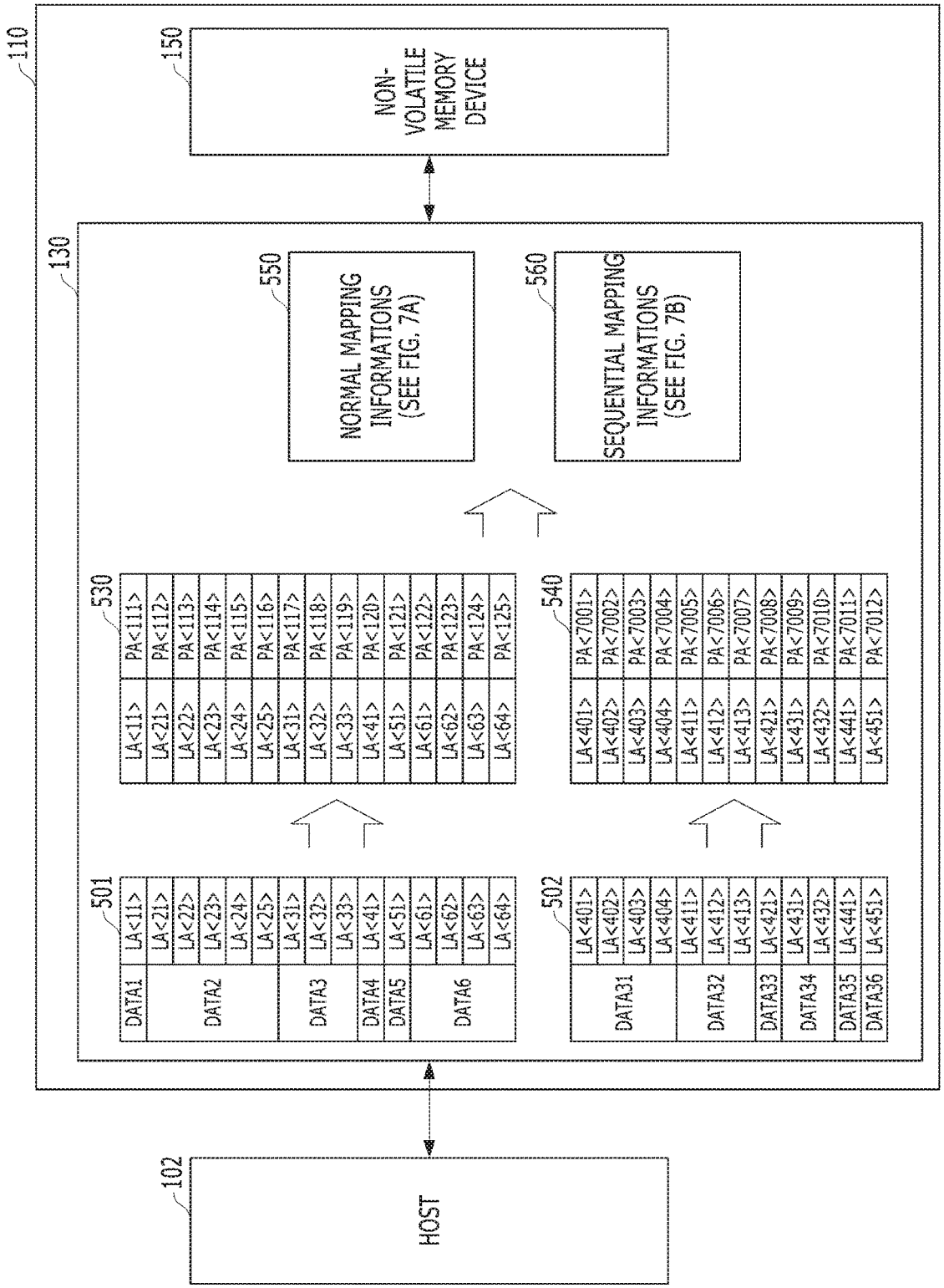
FIG. 6 is a diagram which describes an operation of mapping physical addresses and logical addresses in the memory system in accordance with the embodiment.

FIG. 6 is a diagram which describes an operation of mapping physical addresses and logical addresses in the memory system in accordance with the embodiment.

FIGS. 7A and 7B and FIGS. 8A and 8B are diagrams which describe a characterizing mapping operation in accordance with an embodiment, in the mapping operation illustrated in FIG. 6.

First, referring to FIG. 6, it may be seen that there is illustrated the configuration of a memory system 110 including a controller 130 and a nonvolatile memory device 150, by referring to the configuration of the memory system 110 shown in FIG. 1.

For reference, while a configuration in which only one nonvolatile memory device 150 is included in the memory system 110 is illustrated in FIG. 6, this is only for the sake of convenience of description, and a larger number of nonvolatile memory devices may be included in practice.

The nonvolatile memory device 150 includes a plurality of memory blocks as described above with reference to FIG. 1. Each of the memory blocks included in the nonvolatile memory device 150 includes a plurality of pages as described above with reference to FIG. 2.

While it is illustrated in FIG. 6 that a host interface 132, a processor 134, an ECC unit 138, a power management unit 140, a NAND flash controller 142 and a memory 144 which are illustrated in FIG. 1 as being included in a controller 130, these components are omitted from the drawing for the sake of convenience of description and are actually included in the controller 130.

Referring to FIG. 6, the controller 130 may be requested through a program command (not shown) from the host 102 as described above with reference to FIG. 5, to perform an operation of programming program data DATA<1:6, 31:36> in the nonvolatile memory device 150. To this end, the controller 130 may receive the program data DATA<1:6, 31:36> and a plurality of logical addresses LA<11, 21:25, 31:33, 41, 51, 61:64, 401:404, 411:413, 421, 431:432, 441, 451> corresponding to the program data DATA<1:6, 31:36> 501 and 502, together with the program command, from the host 102.

The program data DATA<1:6, 31:36> transferred to the controller 130 from the host 102 may have various sizes. That is, the program data DATA<1:6, 31:36> may include normal data which has a size equal to or smaller than a predetermined size and sequential data which has a size larger than the predetermined size. An information on the size of each of the program data DATA<1:6, 31:36> may be transferred to the controller 130 from the host 102 together with the program command.

The predetermined size may correspond to storage capacity represented by a single physical address PA<x> in the nonvolatile memory device 150.

Therefore, depending on the respective sizes of the program data DATA<1:6, 31:36>, the numbers of logical addresses LA<11, 21:25, 31:33, 41, 51, 61:64, 401:404, 411:413, 421, 431:432, 441, 451> and the numbers of physical addresses PA<111:125> and PA<7001:7012> corresponding to the program data DATA<1:6, 31:36> may vary.

That is, when normal data and a corresponding logical address LA<x> are received in a program operation, the controller 130 selects one physical address PA<x> indicating a storage region for storing the received normal data and maps the selected one physical address PA<x> to the received one logical address LA<x>.

Also, when sequential data and a plurality of sequential logical addresses LA<x> corresponding thereto are received in a program operation, the controller 130 selects a plurality of sequential physical addresses PA<x> indicating a storage region for storing the received sequential data and maps the plurality of selected physical addresses PA<x> to the plurality of received logical addresses LA<x>.

In detail, the controller 130 manages mapping information 530 and 540 for mapping the logical addresses LA<11, 21:25, 31:33, 41, 51, 61:64, 401:404, 411:413, 421, 431:432, 441, 451> to the physical addresses PA<111:125> and PA<7001:7012>.

Among the program data DATA<1:6, 31:36>, the controller 130 determines data DATA<1, 4, 5, 33, 35, 36> each having a size equal to or smaller than the predetermined size, as normal data, and determines data DATA<2, 3, 6, 31, 32, 34> each having a larger size than the predetermined size as sequential data.

Thus, the controller 130 maps normal logical addresses LA<11, 41, 51, 421, 441, 451> corresponding to the normal data DATA<1, 4, 5, 33, 35, 36>, to normal physical addresses PA<111, 120, 121, 7008, 7011, 7012>. It may be seen that the normal logical addresses LA<11, 41, 51, 421, 441, 451> and the normal physical addresses PA<111, 120, 121, 7008, 7011, 7012> are mapped one to one.

In this way, the controller 130 manages mapping information for the normal data DATA<1, 4, 5, 33, 35, 36> as normal mapping information 550, that is, mapping information which map the normal logical addresses LA<11, 41, 51, 421, 441, 451> to the normal physical addresses PA<111, 120, 121, 7008, 7011, 7012>, as illustrated in FIG. 7A.

The controller 130 maps sequential logical addresses LA<21:25, 31:33, 61:64, 401:404, 411:413, 431:432> corresponding to the sequential data DATA<2, 3, 6, 31, 32, 34>, to sequential physical addresses PA<112:116, 117:119, 122:125, 7001:7004, 7005:7007, 7009:7010>. It may be seen that the sequential logical addresses LA<21:25, 31:33, 61:64, 401:404, 411:413, 431:432> and the sequential physical addresses PA<112:116, 117:119, 122:125, 7001:7004, 7005:7007, 7009:7010> are mapped many to many. Referring to FIG. 7B together, it may be seen that the sequential logical addresses LA<21:25, 31:33, 61:64, 401:404, 411:413, 431:432> and the sequential physical addresses PA<112:116, 117:119, 122:125, 7001:7004, 7005:7007, 7009:7010> are mapped in a compressed form.

In this way, the controller 130 manages mapping information for the sequential data DATA<2, 3, 6, 31, 32, 34> as sequential mapping information 560, that is, mapping information which map the sequential logical addresses LA<21:25, 31:33, 61:64, 401:404, 411:413, 431:432> to the sequential physical addresses PA<112:116, 117:119, 122:125, 7001:7004, 7005:7007, 7009:7010>, as illustrated in FIG. 7B.

Meanwhile, the controller 130 in accordance with the embodiment of the present disclosure divides the logical addresses into two or more groups. For example, the division of the logical addresses may depend on a range of the logical addresses. As exemplified in FIG. 6, the controller 130 may divide the logical addresses LA<11, 21:25, 31:33, 41, 51, 61:64, 401:404, 411:413, 421, 431:432, 441, 451> corresponding to the program data DATA<1:6, 31:36> into first logical addresses LA<11, 21:25, 31:33, 41, 51, 61:64> and second logical addresses LA<401:404, 411:413, 421, 431:432, 441, 451>. That is, among the logical addresses LA<11, 21:25, 31:33, 41, 51, 61:64, 401:404, 411:413, 421, 431:432, 441, 451>, the controller 130 may determine the logical addresses LA<11, 21:25, 31:33, 41, 51, 61:64> as the first logical addresses. Also, the controller 130 may determine the logical addresses LA<401:404, 411:413, 421, 431:432, 441, 451> as the second logical addresses. For reference, the first predetermined range and the second predetermined range are examples and may be different depending on a designer's choice. Moreover, dividing logical addresses into two predetermined ranges is also an example, and it is possible to divide logical addresses into three or more predetermined ranges depending on a designer's choice.

In this way, the controller 130 in accordance with the embodiment of the present disclosure divides the logical addresses LA<11, 21:25, 31:33, 41, 51, 61:64, 401:404, 411:413, 421, 431:432, 441, 451> applied from the host 102, into the first logical addresses LA<11, 21:25, 31:33, 41, 51, 61:64> and the second logical addresses LA<401:404, 411: 413, 421, 431:432, 441, 451>, and then, maps the first logical addresses LA<11, 21:25, 31:33, 41, 51, 61:64> to first physical addresses PA<111:125> and maps the second logical addresses LA<401:404, 411:413, 421, 431:432, 441, 451> to second physical addresses PA<7001:7012>.

In summary, the controller 130 manages first mapping information 530 for mapping N number of first logical addresses LA<11, 21:25, 31:33, 41, 51, 61:64> among the logical addresses LA<11, 21:25, 31:33, 41, 51, 61:64, 401: 404, 411:413, 421, 431:432, 441, 451> applied from the host 102, to N number of first physical addresses PA<111:125>. Moreover, the controller 130 manages second mapping information 540 for mapping M number of second logical addresses LA<401:404, 411:413, 421, 431:432, 441, 451> among the logical addresses LA<11, 21:25, 31:33, 41, 51, 61:64, 401:404, 411:413, 421, 431:432, 441, 451> applied from the host 102, to M number of second physical addresses PA<7001:7012>. Each of N and M is a natural number. It is illustrated in FIG. 6 that N is '15' and M is '12,' and the following descriptions will be made based on the illustration of FIG. 6.

In detail, the controller 130 divides the total of 27 logical addresses LA<11, 21:25, 31:33, 41, 51, 61:64, 401:404, 411:413, 421, 431:432, 441, 451> applied from the host 102, into 15 first logical addresses LA<11, 21:25, 31:33, 41, 51, 61:64> and 12 second logical addresses LA<401:404, 411: 413, 421, 431:432, 441, 451>. The controller 130 manages the first mapping information 530 for mapping the 15 first logical addresses LA<11, 21:25, 31:33, 41, 51, 61:64> to 15 first physical addresses PA<111:125>. The controller 130 manages the second mapping information 540 for mapping the 12 second logical addresses LA<401:404, 411:413, 421, 431:432, 441, 451> to 12 second physical addresses PA<7001:7012>.

Referring to FIG. 7A together with FIG. 6, how the controller 130 manages the normal mapping information 550 may be seen.

In detail, the controller 130 manages first mapping information 530 for mapping respective one first logical addresses LA<11>, LA<41> and LA<51> and respective one first physical addresses PA<111>, PA<120> and PA<121> which are not sequential, as first normal mapping information 552.

The controller 130 manages second mapping information 540 for mapping respective one second logical addresses LA<421>, LA<441> and LA<451> and respective one second physical addresses PA<7008>, PA<7011> and PA<7012> which are not sequential, as second normal mapping information 554.

Referring to FIG. 7B together with FIG. 6, how the controller 130 manages the sequential mapping information 560 may be seen.

In detail, the controller 130 compresses first mapping information 530 for mapping respective at least two first logical addresses LA<21:25>, LA<31:33> and LA<61:64> and respective at least two first physical addresses PA<112: 116>, PA<117:119> and PA<122:125> which have sequential values, and manages the compressed first mapping information 530 as first sequential mapping information 562.

The controller 130 compresses second mapping information 540 for mapping respective at least two second logical addresses LA<401:404>, LA<411:413> and LA<431:432> and respective at least two second physical addresses PA<7001:7004>, PA<7005:7007> and PA<7009:7010> which have sequential values, and manages the compressed second mapping information 540 as second sequential mapping information 564.

Figure 8A:
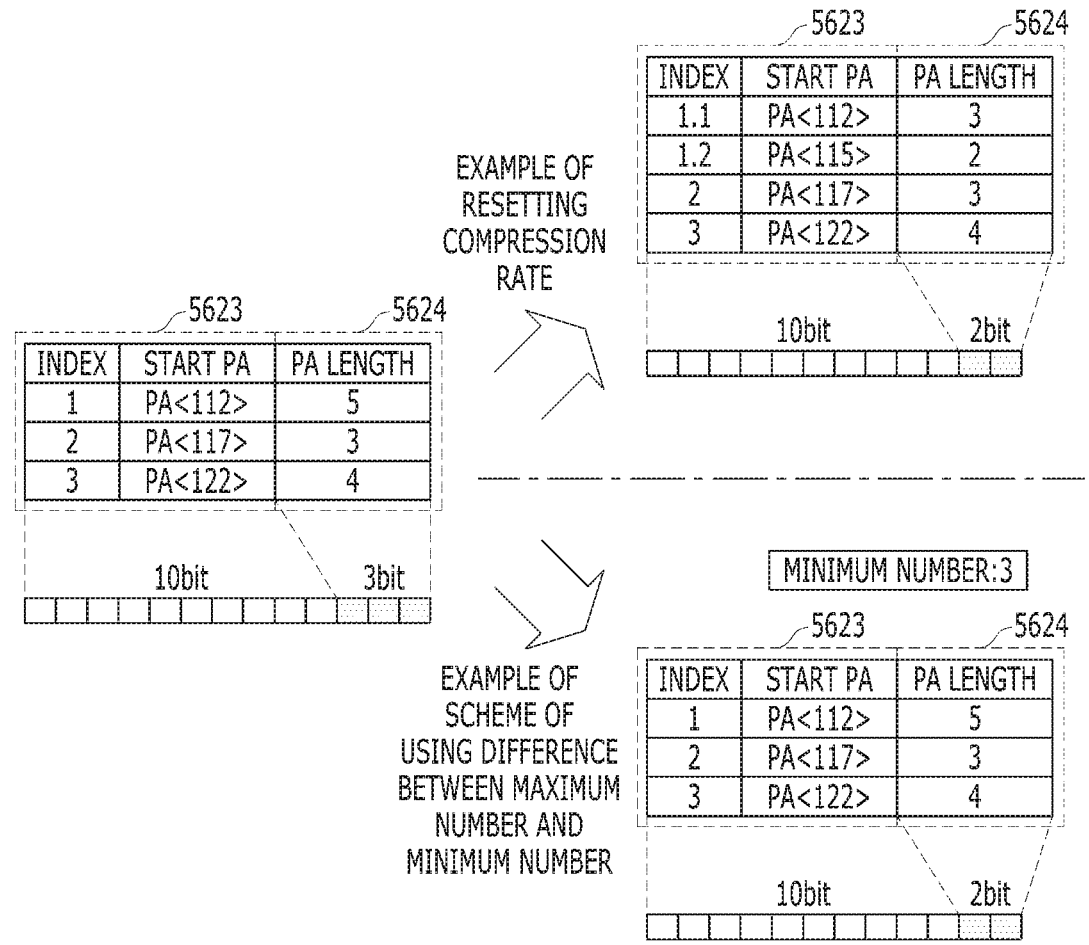
Figure 8B:
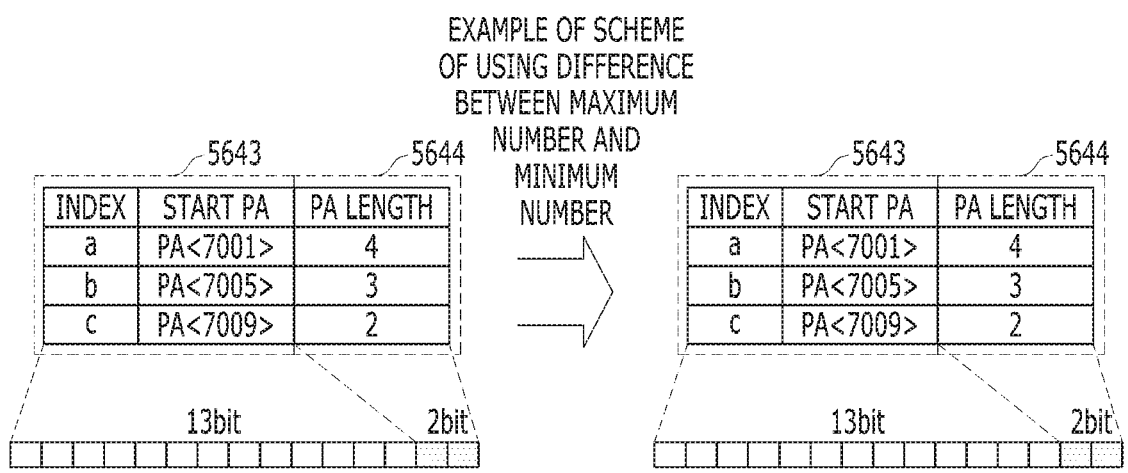

Referring to FIGS. 8A and 8B together, the controller 130 uses a first number of bits to manage the respective pieces of first sequential mapping information 562, and uses a second number of bits to manage the respective pieces of second sequential mapping information 564. That is, the controller 130 differentiates the number of bits used to manage the respective pieces of first sequential mapping information 562 and the number of bits used to manage the respective pieces of second sequential mapping information 564 from each other. For example, as shown in the drawings, the controller 130 may use 13 bits to manage the respective pieces of first sequential mapping information 562, and may use 15 bits to manage the respective pieces of second sequential mapping information 564.

While not directly shown in a drawing, each of the first normal mapping information 552 and the second normal mapping information 554 uses a third number of bits. In other words, it may be seen that the same number of bits is used to manage the respective pieces of first normal mapping information 552 and the respective pieces of second normal mapping information 554.

Referring again to FIG. 7B, the first sequential mapping information 562 include first start logical information 5621, first length logical information 5622, first start physical information 5623 and first length physical information 5624.

The first start logical information 5621 include start logical addresses START LA of the respective at least two first logical addresses LA<21:25>, LA<31:33> and LA<61: 64>, and first index information INDEX for mapping with the first physical addresses PA<112:116>, PA<117:119> and PA<122:125>.

The first length logical information 5622 include information LA LENGTH on the numbers of the first logical addresses LA<21:25>, LA<31:33> and LA<61:64>.

The first start physical information 5623 include start physical addresses START PA of the respective at least two first physical addresses PA<112:116>, PA<117:119> and PA<122:125>, and first index information INDEX for mapping with the first logical addresses LA<21:25>, LA<31: 33> and LA<61:64>.

The first length physical information 5624 include information PA LENGTH on the numbers of the first physical addresses PA<112:116>, PA<117:119> and PA<122:125>.

The respective pieces of first sequential mapping information 562 may map the first start logical information 5621 and the first start physical information 5623 to each other through the first index information INDEX.

The second sequential mapping information 564 include second start logical information 5641, second length logical information 5642, second start physical information 5643 and second length physical information 5644.

The second start logical information 5641 include start logical addresses START LA of the respective at least two second logical addresses LA<401:404>, LA<411:413> and LA<431:432>, and second index information INDEX for mapping with the second physical addresses PA<7001: 7004>, PA<7005:7007> and PA<7009:7010>.

The second length logical information 5642 include information LA LENGTH on the numbers of the second logical addresses LA<401:404>, LA<411:413> and LA<431:432>.

The second start physical information 5643 include start physical addresses START PA of the respective at least two second physical addresses PA<7001:7004>, PA<7005: 7007> and PA<7009:7010>, and second index information INDEX for mapping with the second logical addresses LA<401:404>, LA<411:413> and LA<431:432>.

The second length physical information 5644 include information PA LENGTH on the numbers of the second physical addresses PA<7001:7004>, PA<7005:7007> and PA<7009:7010>.

The respective pieces of second sequential mapping information 564 may map the second start logical information 5641 and the second start physical information 5643 through the second index information INDEX.

As described above, the controller 130 may differentiate the number of bits used to manage the respective pieces of first sequential mapping information 562 and the number of bits used to manage the respective pieces of second sequential mapping information 562 from each other.

To this end, the controller 130 determines a number of bits for representing a largest value PA<122> among the start physical addresses PA<112>, PA<117> and PA<122> included in the first sequential mapping information 562, together with the first index information INDEX, and manages the first start physical information 5623 based on the determined number of bits.

The controller 130 determines a number of bits for representing a largest value PA<7009> among the start physical addresses PA<7001>, PA<7005> and PA<7009> included in the second sequential mapping information 564, together with the second index information INDEX, and manages the second start physical information 5643 based on the determined number of bits.

For example, referring to FIG. 8A, it may be assumed that a start physical address having a largest value among the start physical addresses PA<112>, PA<117> and PA<122> included in the first sequential mapping information 562 is the start physical address PA<122>, and the first start physical information 5623 may be managed by using 10 number of bits to represent the start physical addresses PA<112>, PA<117> and PA<122> together with the first index information INDEX.

On the other hand, referring to FIG. 8B, it may be assumed that a start physical address having a largest value among the start physical addresses PA<7001>, PA<7005> and PA<7009> included in the second sequential mapping information 564 is the start physical address PA<7009>, and the second start physical information 5643 may be managed by using 13 number of bits to represent the start physical addresses PA<7001>, PA<7005> and PA<7009> together with the second index information INDEX.

Namely, because the values of the start physical information included in the first sequential mapping information 562 and the values of the start physical information included in the second sequential mapping information 564 are different from each other and the number of the first index information INDEX and the number of the second index information INDEX may be different from each other, the number of bits to represent the first start physical information 5623 and the size of bits to represent the second start physical information 5643 may be different from each other.

In the embodiment, it is assumed that the start physical addresses PA<112>, PA<117> and PA<122> respectively included in the first sequential mapping information 562 are managed by using data of a smaller number of bits than the start physical addresses PA<7001>, PA<7005> and PA<7009> respectively included in the second sequential mapping information 564.

This is because, when assuming that a plurality of physical addresses PA<x> the values of which sequentially increase from a predetermined start value correspond to a plurality of storage regions (not shown), respectively, included in the nonvolatile memory device 150, it is assumed that the start physical addresses PA<112>, PA<117> and PA<122> respectively included in the first sequential mapping information 562 are relatively closer to the predetermined start value than the start physical addresses PA<7001>, PA<7005> and PA<7009> respectively included in the second sequential mapping information 564.

In the case where it is assumed that the start physical addresses PA<112>, PA<117> and PA<122> respectively included in the first sequential mapping information 562 are relatively farther from a predetermined start value than the start physical addresses PA<7001>, PA<7005> and PA<7009> respectively included in the second sequential mapping information 564, the start physical addresses PA<112>, PA<117> and PA<122> respectively included in the first sequential mapping information 562 may be managed by using data of a larger number of bits than the start physical addresses PA<7001>, PA<7005> and PA<7009> respectively included in the second sequential mapping information 564.

In summary, the controller 130 may match the plurality of physical addresses PA<x> the values of which sequentially increase from the predetermined start value, to the plurality of storage regions, respectively, included in the nonvolatile memory device 150.

Therefore, in the case where the start physical addresses PA<112>, PA<117> and PA<122> respectively included in the first sequential mapping information 562 are relatively closer to the predetermined start value than the start physical addresses PA<7001>, PA<7005> and PA<7009> respectively included in the second sequential mapping information 564, the controller 130 manages the first start physical information 5623 to have a smaller bit size than the second start physical information 5643.

Conversely, in the case where the start physical addresses PA<112>, PA<117> and PA<122> respectively included in the first sequential mapping information 562 are relatively farther from the predetermined start value than the start physical addresses PA<7001>, PA<7005> and PA<7009> respectively included in the second sequential mapping information 564, the controller 130 manages the first start physical information 5623 to have a larger bit size than the second start physical information 5643.

The controller 130 may determine numbers of bits for managing the first length physical information 5624 and the second length physical information 5644, by using any one method among various methods to be described below.

A first method is a method of using a maximum number.

In detail, the controller 130 determines a bit size necessary to count a maximum number among the numbers of the first physical addresses PA<112:116>, PA<117:119> and PA<122:125> respectively included in the first sequential mapping information 562, and manages the first length physical information 5624 by using the determined bit size.

For example, in FIG. 8A, the numbers of the first physical addresses PA<112:116>, PA<117:119> and PA<122:125> respectively included in the first sequential mapping information 562 are 5, 3 and 4, respectively, and a maximum number is 5. Thus, the controller 130 manages the first length physical information 5624 by using 3 bits as a bit size necessary to count the maximum number of 5.

The controller 130 determines a bit size necessary to count a maximum number among the numbers of the second physical addresses PA<7001:7004>, PA<7005:7007> and PA<7009:7010> respectively included in the second sequential mapping information 564, and manages the second length physical information 5644 by using the determined bit size.

For example, in FIG. 8B, the numbers of the second physical addresses PA<7001:7004>, PA<7005:7007> and PA<7009:7010> respectively included in the second sequential mapping information 564 are 4, 3 and 2, respectively, and a maximum number is 4. Thus, the controller 130 manages the second length physical information 5644 by using 2 bits as a bit size necessary to count the maximum number of 4.

A second method is a method of using an average number.

In detail, the controller 130 calculates the average number of the numbers of the first physical addresses PA<112:116>, PA<117:119> and PA<122:125> respectively included in the first sequential mapping information 562, as a first average number. Then, the controller 130 resets a compression rate of the first sequential mapping information 562 such that the numbers of the first physical addresses PA<112:116>, PA<117:119> and PA<122:125> respectively included in the first sequential mapping information 562 become equal to or smaller than the first average number. Thereafter, the controller 130 determines a bit size necessary to count the first average number, and manages the first length physical information 5624 by using the determined bit size.

For example, in FIG. 8A, the numbers of the first physical addresses PA<112:116>, PA<117:119> and PA<122:125> respectively included in the first sequential mapping information 562 are 5, 3 and 4, respectively, and the first average number is 4. Since the first average number is 4, the controller 130 manages the first length physical information 5624 by using 2 bits as a bit size necessary to count the first average number of 4. In this regard, the second first physical addresses PA<117:119> include 3 physical addresses, and the third first physical addresses PA<122:125> include 4 physical addresses. Therefore, it is possible to count the second first physical addresses PA<117:119> and the third first physical addresses PA<122:125> by using the size of 2 bits necessary to count the first average number calculated as 4. However, since the first first physical addresses PA<112:116> include 5 physical addresses, it is impossible to count the first first physical addresses PA<112:116> by using the size of 2 bits necessary to count the first average number calculated as 4. Because of this fact, the controller 130 may use a scheme of resetting a compression rate of the first sequential mapping information 562, by dividing the 5 physical addresses PA<112:116> included in the first first physical addresses PA<112:116>, into 3 physical addresses PA<112:114> and 2 physical addresses PA<115:116> and then including the divided physical addresses PA<112:114> and PA<115:116>, in the first sequential mapping information 562. In this way, by resetting a compression rate of the first sequential mapping information 562, it is possible to count the first first physical addresses PA<112:114> and PA<115:116> divided into two parts, by using the size of 2 bits necessary to count the first average number calculated as 4.

For reference, if a compression rate of the first sequential mapping information 562 is reset as shown in FIG. 8A, the values of the first index information INDEX should be appropriately changed to result in index information INDEX, such that mapping with the first logical addresses LA<21:25>, LA<31:33> and LA<61:64> may be maintained.

The controller 130 calculates an average number of the numbers of the second physical addresses PA<7001:7004>, PA<7005:7007> and PA<7009:7010> respectively included in the second sequential mapping information 564, as a second average number. Then, the controller 130 resets a compression rate of the second sequential mapping information 564 such that the numbers of the second physical addresses PA<7001:7004>, PA<7005:7007> and PA<7009:7010> respectively included in the second sequential mapping information 564 become equal to or smaller than the second average number. Thereafter, the controller 130 determines a bit size necessary to count the second average number, and manages the second length physical information 5644 by using the determined bit size.

For example, in FIG. 8B, the numbers of the second physical addresses PA<7001:7004>, PA<7005:7007> and PA<7009:7010> respectively included in the second sequential mapping information 564 are 4, 3 and 2, respectively, and the second average number is 3. Since the second average number is 3, the controller 130 manages the second length physical information 5644 by using 2 bits as a bit size necessary to count the second average number of 3.

A third method is a method of using a difference between a maximum number and a minimum number.

In detail, the controller 130 sets a maximum number and a minimum number in the numbers of the first physical addresses PA<112:116>, PA<117:119> and PA<122:125> respectively included in the first sequential mapping information 562, as a first maximum number and a first minimum number, respectively. Thereafter, the controller 130 determines a bit size necessary to count the difference between the first maximum number and the first minimum number, and manages the first length physical information 5624 by using the determined bit size based on the first minimum number. In this regard, the controller 130 may divide the first sequential mapping information 562 into K number of groups depending on a preset condition and may set independently a first minimum number for each of the K number of groups. K is a natural number.

For example, in FIG. 8A, the numbers of the first physical addresses PA<112:116>, PA<117:119> and PA<122:125> respectively included in the first sequential mapping information 562 are 5, 3 and 4, respectively, and the first maximum number is 5 and the first minimum number is 3. Since the difference between the first maximum number and the first minimum number is 2, the controller 130 manages the first length physical information 5624 by using 2 bits as a bit size necessary to count the difference of 2 based on the first minimum number of 3. For reference, in FIG. 8A, it may be seen that the first sequential mapping information 562 manage the first length physical information 5624 based on one first minimum number. In the case where, unlike the illustration of the drawing, the number of the first sequential mapping information 562 exceeds a specified number and the respective pieces of first sequential mapping information 562 include various numbers of physical addresses PA<x>, the first sequential mapping information 562 may be divided into a plurality of groups, and a first minimum number may be independently set for each of the groups.

The controller 130 sets a maximum number and a minimum number in the numbers of the second physical addresses PA<7001:7004>, PA<7005:7007> and PA<7009:7010> respectively included in the second sequential mapping information 564, as a second maximum number and a second minimum number, respectively. Thereafter, the controller 130 determines a bit size necessary to count the difference between the second maximum number and the second minimum number, and manages the second length physical information 5644 by using the determined bit size based on the second minimum number. In this regard, the controller 130 may divide the second sequential mapping information 564 into L number of groups depending on a preset condition and may set independently a second minimum number for each of the L number of groups. L is a natural number.

For example, in FIG. 8B, the numbers of the second physical addresses PA<7001:7004>, PA<7005:7007> and PA<7009:7010> respectively included in the second sequential mapping information 564 are 4, 3 and 2, respectively, and the second maximum number is 4 and the second minimum number is 2. Since the difference between the second maximum number and the second minimum number is 2, the controller 130 manages the second length physical information 5644 by using 2 bits as a bit size necessary to count the difference of 2 based on the second minimum number of 2. For reference, in FIG. 8B, it may be seen that the second sequential mapping information 564 manage the second length physical information 5644 based on one second minimum number. In the case where, unlike the illustration of the drawing, the number of the second sequential mapping information 564 exceeds a specified number and the respective pieces of second sequential mapping information 564 include various numbers of physical addresses PA<x>, the second sequential mapping information 564 may be divided into a plurality of groups, and a second minimum number may be independently set for each of the groups.

Hereinbelow, detailed descriptions will be made with reference to FIGS. 9 to 17, for a data processing system and electronic appliances to which the memory system 110 including the memory device 150 and the controller 130 described above with reference to FIGS. 1 to 8B, in accordance with the embodiment of the present disclosure, is applied.

FIGS. 9 to 17 are diagrams schematically illustrating application examples of the data processing system of FIG. 1.

Figure 9:
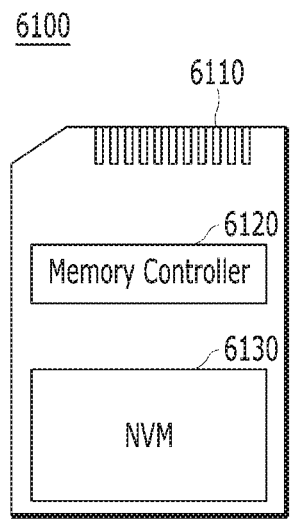
FIGS. 9 to 17 are diagrams schematically illustrating application examples of the data processing system shown in FIG. 1 in accordance with various embodiments of the present invention.

FIG. 9 is a diagram schematically illustrating another example of the data processing system including the memory system in accordance with the present embodiment. FIG. 9 schematically illustrates a memory card system to which the memory system in accordance with the present embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM), The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
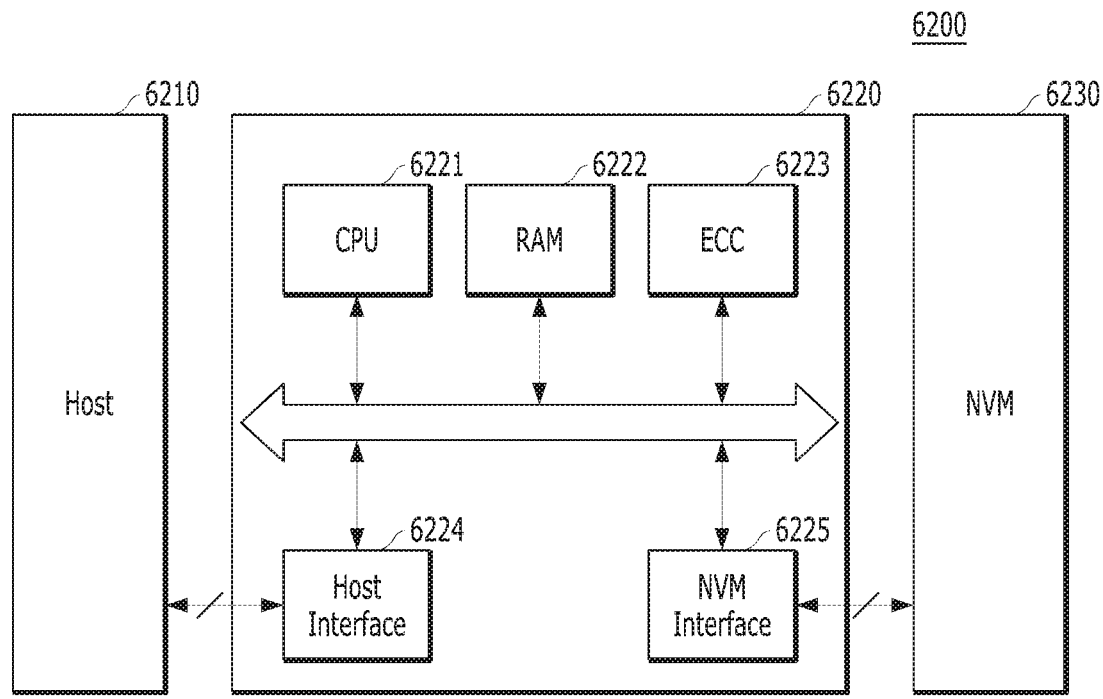

FIG. 10 is a diagram schematically illustrating another example of the data processing system including the memory system in accordance with the present embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
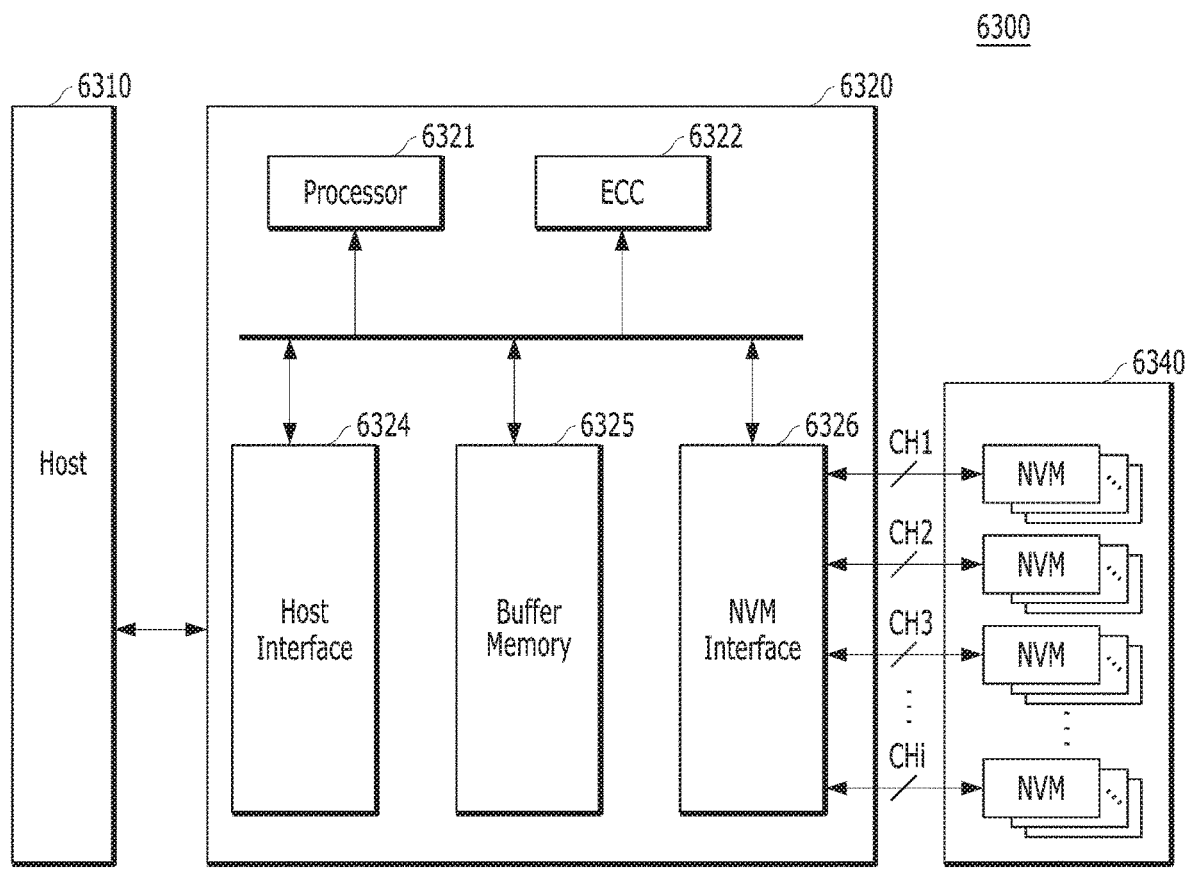

FIG. 11 is a diagram schematically illustrating another example of the data processing system including the memory system in accordance with the present embodiment. FIG. 11 schematically illustrates an SSD to which the memory system in accordance with the present embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIGS. 1 and 5, and the memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 10 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
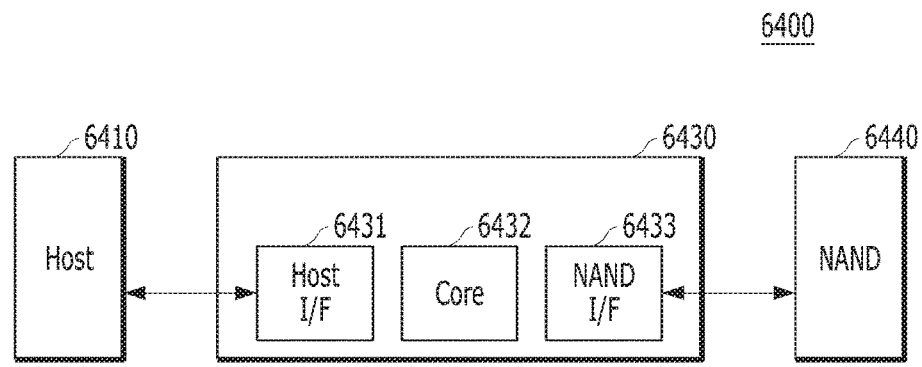

FIG. 12 is a diagram schematically illustrating another example of the data processing system including the memory system in accordance with the present embodiment. FIG. 12 schematically illustrates an embedded Multi-Media Card (eMMC) to which the memory system in accordance with the present embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 and 5, and the memory device 6440 may correspond to the memory device 150 in the memory system 110 of FIGS. 1 and 5.

More specifically, the controller 6430 may be connected to the memory device 6440 through a plurality of channels.

The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with the present embodiment. FIGS. 13 to 16 schematically illustrate UFS (Universal Flash Storage) systems to which the memory system in accordance with the present embodiment is applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 13:
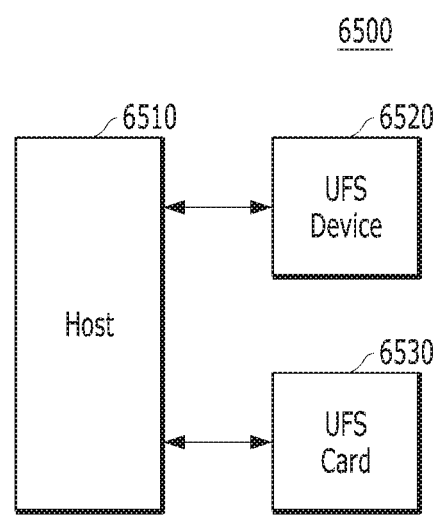

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
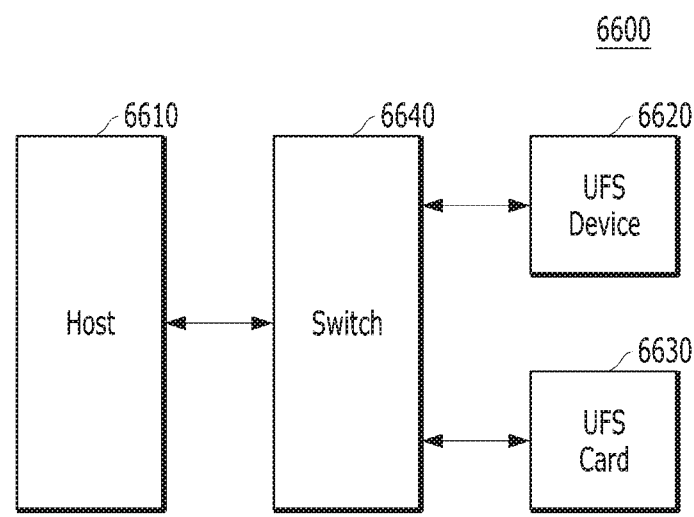

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
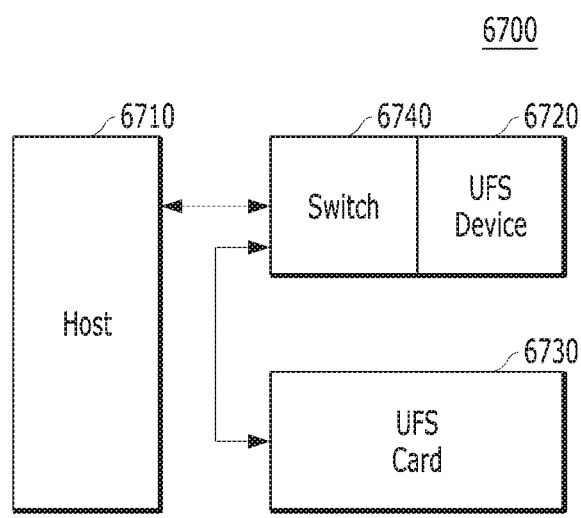

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
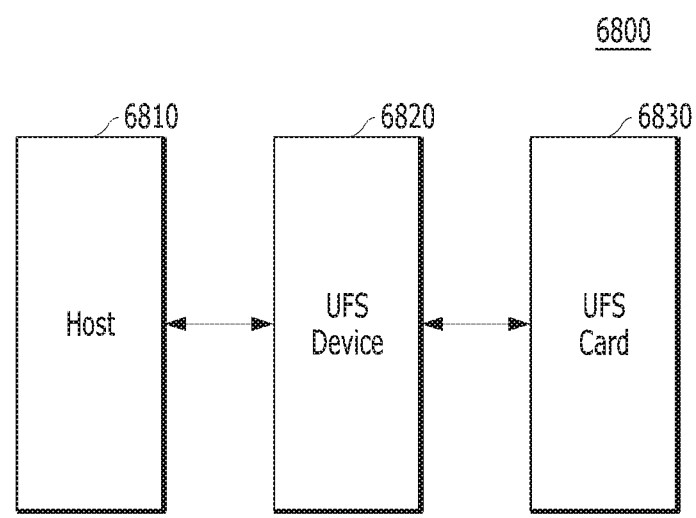

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
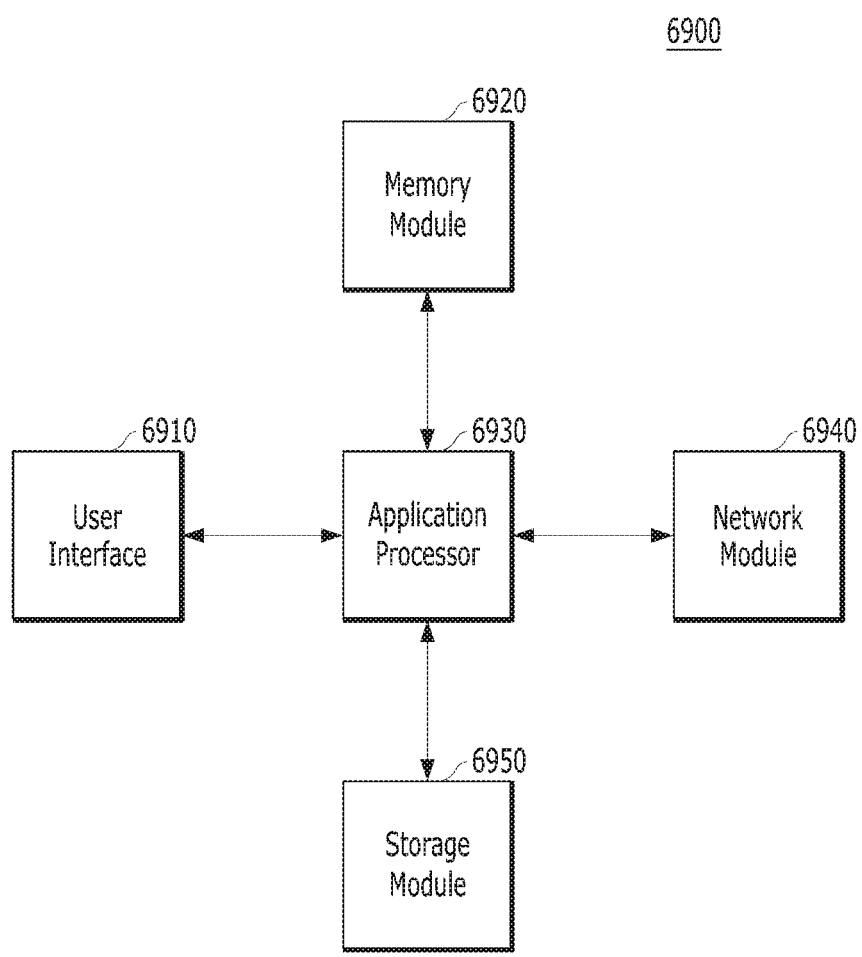

FIG. 17 is a diagram schematically illustrating another example of the data processing system including the memory system in accordance with an embodiment. FIG. 17 is a diagram schematically illustrating a user system to which the memory system in accordance with the present embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

In the present technology, when managing a mapping information for mapping a logical address and a physical address, the mapping information may be used by being changed in its size depending on the type of the mapping information.

Due to this fact, it is possible to minimize a space to be occupied by the mapping information.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a nonvolatile memory device; and
   a controller suitable for managing, when a plurality of data and a plurality of logical addresses corresponding thereto are received from a host, first mapping information for mapping a number of first logical addresses among the logical addresses to a number of first physical addresses and second mapping information for mapping a number of second logical addresses among the logical addresses to a number of second physical addresses,
   wherein the controller compresses the first mapping information of at least two first logical addresses, which are sequential, and at least two first physical addresses into first sequential mapping information, and compresses the second mapping information of at least two second logical addresses, which are sequential, and at least two second physical addresses into second sequential mapping information,
   wherein, when a plurality of physical addresses values correspond to a plurality of storage regions included in the nonvolatile memory device, respectively, the controller differently determines a first number of bits and a second number of bits according to difference in position of storage area indicated by the first physical addresses and storage area indicated by the second physical addresses among the storage regions, and
   wherein the first number of bits is a bit size necessary to count a largest value among the first physical addresses, and the second number of bits is a bit size necessary to count a largest value among the second physical addresses.

2. The memory system according to claim 1, wherein each of the first sequential mapping information comprises:
   a first start logical information including a start logical address of the at least two first logical addresses and a first index information for mapping with the first physical addresses;

a first length logical information including an information on the number of the at least two first logical addresses;

a first start physical information including a start physical address of the at least two first physical addresses and the first index information for mapping with the first logical addresses; and a first length physical information including an information on the number of the at least two first physical addresses.

3. The memory system according to claim 2, wherein each of the second sequential mapping information comprises:

a second start logical information including a start logical address of the at least two second logical addresses and a second index information for mapping with the second physical addresses;

a second length logical information including an information on the number of the at least two second logical addresses;

a second start physical information including a start physical address of the at least two second physical addresses and the second index information for mapping with the second logical addresses; and a second length physical information including an information on the number of the at least two second physical addresses.

4. The memory system according to claim 3, wherein the controller determines a bit size necessary to count a largest value among start physical addresses included in the first sequential mapping information, together with the first index information as the first number of bits, and wherein the controller determines a bit size necessary to count a largest value among start physical addresses included in the second sequential mapping information, together with the second index information as the second number of bits.

5. The memory system according to claim 3, wherein the controller calculates an average number of the numbers of first physical addresses included in the first sequential mapping information as a first average number, resets a compression rate of the first sequential mapping information such that the number of first physical addresses included in the first sequential mapping information becomes equal to or smaller than the first average number, and determines a bit size in the first number of bits necessary to count the first average number, and wherein the controller calculates an average number of the numbers of second physical addresses included in the second sequential mapping information as a second average number, resets a compression rate of the second sequential mapping information such that the number of second physical addresses included in the second sequential mapping information becomes equal to or smaller than the second average number, and determines a bit size in the second number of bits necessary to count the second average number.

6. The memory system according to claim 3, wherein the controller sets a maximum number and a minimum number in the numbers of first physical addresses included in the first sequential mapping information as a first maximum number and a first minimum number, respectively, determines a bit size in the first number of bits necessary to count a difference between the first maximum number and the first minimum number, and manages the first length physical information by using the determined bit size based on the first minimum number, wherein the controller sets a maximum number and a minimum number in the numbers of second physical addresses included in the second sequential mapping information as a second maximum number and a second minimum number, respectively, determines a bit size in the second number of bits necessary to count a difference between the second maximum number and the second minimum number, and manages the second length physical information by using the determined bit size based on the second minimum number.

7. The memory system according to claim 3, wherein the controller determines a bit size in the first number of bits necessary to count a maximum number among the numbers of first physical addresses included in the first sequential mapping information, and wherein the controller determines a bit size in the second number of bits necessary to count a maximum number among the numbers of second physical addresses included in the second sequential mapping information.

8. The memory system according to claim 1, wherein, when position of storage area indicated by the first physical addresses are relatively closer to position of storage area indicated by the predetermined start value than position of storage area indicated by the second physical addresses, the controller determines that the first number of bits to have a bit size smaller than the second number of bits.

* * * * *